May 29, 1928.  
G. LEVIEN  
AUTOMOBILE ORNAMENT  
Filed June 1, 1926
1,671,770
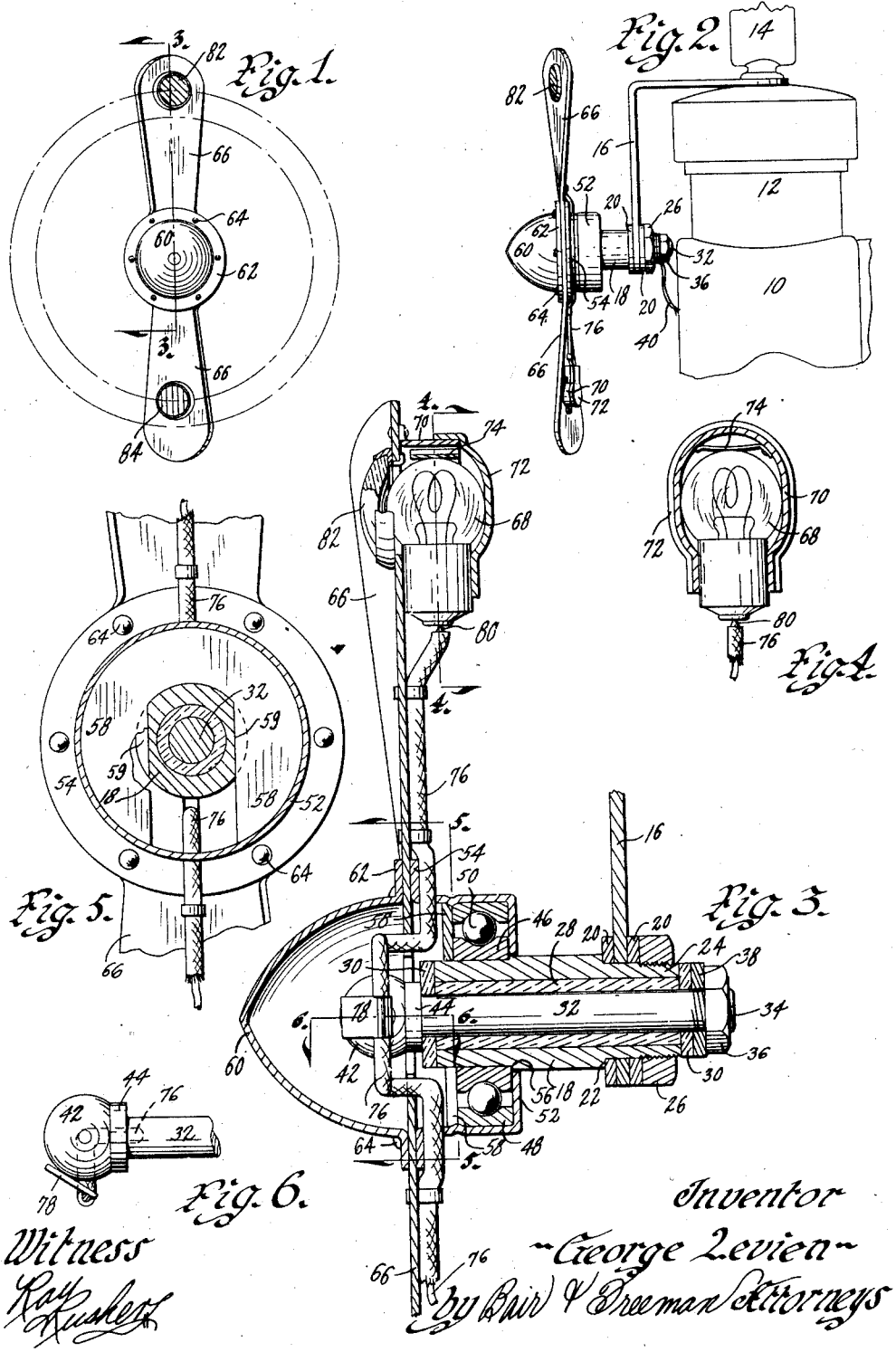

Patented May 29, 1928.

1,671,770

UNITED STATES PATENT OFFICE.

GEORGE LEVIEN, OF DES MOINES, IOWA.

AUTOMOBILE ORNAMENT.

Application filed June 1, 1926. Serial No. 112,872.

The object of my invention is to provide an automobile ornament adapted to rotate when the automobile is moved forwardly and when illuminated to cause concentric rings of different colors, the parts being of simple durable and comparatively inexpensive construction.

Still a further object is to provide fan blades having lights mounted therein different distances from the center or axis of rotation so that when the fan blades are revolved at a high rate of speed they will appear as a circle within a circle of different colored lights.

Still a further object is to construct and arrange the parts of the ornament whereby the device may be quickly and readily assembled and parts may be replaced when necessary.

With these and other objects in view, my invention consists in the construction, arrangement and combination of the various parts of my automobile ornament, whereby the objects contemplated are attained, as hereinafter more fully set forth, pointed out in my claims, and illustrated in the accompanying drawings, in which:

Figure 1, is a front plan view of my device, the dotted lines showing the path of movement of the two lights.

Figure 2, is a side view illustrating the mounting of the ornament upon the radiator of an automobile.

Figure 3, is a sectional view taken on line 3—3 of Figure 1.

Figure 4, is a detail sectional view taken on line 4—4 if Figure 3, illustrating the mounting of one of the light bulbs.

Figure 5, is a sectional view taken on line 5—5 of Figure 3, and

Figure 6, is a detail view taken on line 6—6 of Figure 3.

In the accompanying drawings I have used the reference numeral 10 to indicate generally an automobile radiator provided with a spout 12 and a motometer or the like 14. My ornament may either be mounted upon the spout 12 or upon the radiator proper.

It is desirable to mount the device in such a position as to come in contact with the wind or air as the automobile moves forwardly.

My device includes a bracket 16 of any suitable construction and shape whereby the entire device may be supported upon an automobile. A metalic sleeve 18 is extended through the lower end of the bracket 16 and has a washer 20 positioned on each side of the bracket.

One of the washers 20 rests against a shoulder 22 formed upon the sleeve 18. One end of the sleeve 18 is screw threaded as at 24 for receiving the nut 26 thereon. The nut 26 holds the bracket 16 in fixed relation to the sleeve 18 as clearly shown in Figures 2 and 3 of the drawings.

Within the sleeve 18 is a second or inner sleeve 28 formed of nonconducting material. A washer 30 is placed at each end of the sleeves 18 and 28. The washers 30 are of nonconducting material.

Within the sleeve 28 is a shaft 32 having one end screw threaded as at 34 for receiving the nut 36. Between the nut 36 and the washer 30 is a metallic washer 38.

An electric wire 40 is in contact with the shaft 32. It will be noted from the construction illustrated in Figure 3 of the drawings that the sleeve 18 is insulated away from the wire 40.

The sleeve 18 serves as a ground wire for the device and this is the reason why the wire 40 is insulated therefrom. The inner end of the shaft 32 is formed with a ball head 42 and a shoulder 44.

The shaft 32 holds both sleeves 18 and 28 in assembled position. Mounted upon one end of the sleeve 18 is a fixed ball race. A movable ball race 48 is spaced around the ball race 46 and the ball bearings 50 are received therebetween.

A cap 52 extends around the ball bearings and has an outturned annular flange 54 whereby the cover is held in position as will hereinafter be more fully set forth.

In order to hold the ball bearing race 46 in position upon the sleeve 18 I provide a small shoulder 56 upon one side and key washer 58 upon the other side. The washer 58 slips over the sleeve 18 and engages the flat sides 59.

A forward cone shaped cap 60 incloses the ball head 42 and has an outturned annular flange 62 which is substantially the same size as the flange 54 and these two flanges are connected together by rivets or the like 64.

A pair of oppositely extending fan blades 66 are interposed between the two flanges 54 and 62 as is clearly shown in Figures 1 and 3 of the drawings.

Mounted upon each fan blade a different distance from the center of the shaft 32 are light bulbs 68. The light bulbs 68 are mounted in sockets 70 formed upon the blades 66.

A socket cap 72 slips over the sockets 70 and holds the light bulbs 68 in position. A spring clip 74 engages the upper end of the bulbs 68 and forces them downwardly or towards the center of the device.

An insulating wire 76 is mounted upon each blade and is in contact with the ball head 42 by means of the blade 78. The blade 78 is soldered or otherwise fastened to the wire 76 and is in engagement with the head 42 so that rotation of the blades 66 will always insure contact between the blade 78 and the ball head 42. The wires 76 are pointed as at 80 and the points 80 are in contact with the light bulbs 68.

Spring clips 74 push the light bulbs against the point 80. A green jewel or lens 82 is mounted in one of the blades 66 while a red jewel or lens 84 is mounted in another of the blades 66.

When the automobile advances forwardly the fan blades 66 are caused to rotate. The parts rotate around the ball bearings 50 and the rotatable parts include the cover cap 60 and blades 66, together with the parts mounted thereon.

When the blades rotate at a high rate of speed there appear two concentrically arranged circles of illumination and the circles are illustrated by dotted lines in Figure 1 of the drawings.

The cover cap 60 tends to reflect the light cast by the bulbs 68 and add further ornament to the device. The cover cap 60 is highly polished and even in the day time the colored jewels 82 and 84 create a very fine ornamental effect when the parts rotate.

My device is very simple and can be mounted upon any convenient place upon the automobile and may be mounted upon the fenders or even the top of the automobile.

One of the features of my device resides in the arrangement of these colored lights in such a manner as to practically give a two circle illumination of these colors.

Some changes may be made in the arrangement and construction of the parts of my automobile ornament, without departing from the real spirit and purpose of my invention, and it is my intention to cover by my claims, any modified forms of structure or use of mechanical equivalents, which may be reasonably included within their scope.

I claim as my invention:

1. In a device of the class described, a supporting bracket, a pair of fan blades rotatably mounted upon said bracket, a light mounting on each of said blades, said mountings being spaced different distances from the axis of said blades, a light bulb in said mounting, whereby rotation of said blade will carry said light bulbs in concentric circular paths, each of said mountings comprising a socket having one side and one end open, a contact point adjacent said open end and a spring in the opposite end of said socket whereby a light globe may be held between said contact point and said spring.

2. In a device of the class described, a supporting bracket, a shaft supported thereby, a bearing thereon, a pair of fan blades mounted upon said bearing, means for maintaining said bearing in position on said shaft, said means comprising a shoulder on said shaft for one end of the bearing, opposite slots in said shaft adjacent the other end of the bearing and a key washer adapted to engage in said slots and engage the other end of said bearing, a light mounting on each of said blades, said mountings being spaced different distances from the axis of said blades, lenses for said mountings, said lenses being of different colors, a light bulb in said mounting, whereby rotation of said blade will carry said light bulbs in concentric circular paths for forming different colored circles of light, one within the other.

3. In a device of the class described, a supporting bracket, a shaft mounted thereon, a bearing on said shaft, means for maintaining said bearing in position on said shaft, said means comprising a shoulder on said shaft for one end of the bearing, opposite slots in said shaft adjacent the other end of the bearing and a key washer adapted to engage in said slots and engage the other end of said bearing and a cap for enclosing said bearing, said cap serving to retain the key washer in engagement with the slots in said shaft.

Des Moines, Iowa, May 25, 1926.

GEORGE LEVIEN.